United States Patent
Guarnieri et al.

(10) Patent No.: US 9,459,986 B2
(45) Date of Patent: Oct. 4, 2016

(54) AUTOMATIC GENERATION OF ANALYSIS-EQUIVALENT APPLICATION CONSTRUCTS

(71) Applicant: International Business Machines Corporation, Armonk, NY (US)

(72) Inventors: Salvatore A. Guarnieri, New York, NY (US); Marco Pistoia, Amawalk, NY (US); Omer Tripp, Har-Adar (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

(21) Appl. No.: 14/013,003

(22) Filed: Aug. 28, 2013

(65) Prior Publication Data
US 2015/0067653 A1 Mar. 5, 2015

(51) Int. Cl.
G06F 9/44 (2006.01)
G06F 9/45 (2006.01)
G06F 11/36 (2006.01)

(52) U.S. Cl.
CPC ............ *G06F 11/3604* (2013.01); *G06F 8/30* (2013.01); *G06F 8/43* (2013.01); *G06F 8/75* (2013.01); *G06F 8/24* (2013.01); *G06F 8/35* (2013.01); *G06F 8/36* (2013.01)

(58) Field of Classification Search
CPC ............ G06F 8/24; G06F 8/35; G06F 8/36; G06F 8/74; G06F 8/75
See application file for complete search history.

(56) References Cited

U.S. PATENT DOCUMENTS

| | | | |
|---|---|---|---|
| 7,917,900 B2 | 3/2011 | Rajamani et al. | |
| 2004/0044988 A1* | 3/2004 | Schene | G06F 9/45525 717/106 |
| 2005/0204348 A1* | 9/2005 | Horning | G06F 21/14 717/140 |
| 2006/0123009 A1* | 6/2006 | Bruno | G06F 17/30306 |
| 2006/0179425 A1* | 8/2006 | Scougall | G06F 8/30 717/140 |
| 2008/0072214 A1 | 3/2008 | Peyton et al. | |
| 2008/0244539 A1 | 10/2008 | Rajamani et al. | |
| 2010/0083240 A1 | 4/2010 | Siman | |
| 2010/0198799 A1* | 8/2010 | Krishnan | G06F 11/3696 707/702 |
| 2012/0102471 A1* | 4/2012 | Artzi | G06F 8/30 717/133 |

(Continued)

OTHER PUBLICATIONS

Brian White et al., An Integrated Experimental Environment for Distributed Systems and Networks, Oct. 2002, retrieved online on May 10, 2016, pp. 1-16. Retrieved from the Internet: <URL: https://www.cs.utah.edu/flux/papers/netbed-osdi02.pdf?>.*

(Continued)

*Primary Examiner* — Thuy Dao
*Assistant Examiner* — Hanh T Bui
(74) *Attorney, Agent, or Firm* — Daniel P. Morris; Otterstedt, Ellenbogen & Kammer, LLP

(57) ABSTRACT

A computer program to be subjected to static analysis includes at least one framework, in turn including high-level code and at least one configuration file. A specification which describes run-time behavior of the program, including run-time behavior of the at least one framework including the high-level code and the at least one configuration file, is created from the computer program. Based on the specification, synthetic high-level code which accurately simulates the run-time behavior of the at least one framework including the high-level code and the at least one configuration file, without framework usage, is created. Static analysis of the computer program is carried out based on the synthetic high-level code.

14 Claims, 6 Drawing Sheets

(56) References Cited

U.S. PATENT DOCUMENTS

2012/0102474 A1* 4/2012 Artzi .................. G06F 8/75
 717/157
2013/0074052 A1* 3/2013 Adams ................ G06F 8/437
 717/140

OTHER PUBLICATIONS

Masaki Iwasawa, FDPS: A Novel Framework for Developing High-Performance Particle Simulation Codes for Distributed-Memory Systems, ACM, Nov. 2015, retrieved online on May 10, 2016, pp. 1-10. Retrieved from the Internet: <URL: http://delivery.acm.org/10.1145/2840000/2830019/a1-iwasawa.pdf?>.*

Tae-Hyung, K. et al.; "An Interactive Change Impact Analysis Based on an Architectural Reflexion Model Approach"; 2010 IEEE Proceedings of 34th Annual Computer Software and Applications Conference (COMPSAC 2010), pp. 297-302, IEEE Computer Society; 2010.

Anonymous; "System and Method for Static Analysis of Source Code with Integrated Source-to-Source Transformations"; An IP.com Prior Art Database Technical Disclosure; http://ip.com/IPCOM/000205162; Mar. 17, 2011.

"Call graph" downloaded from http://en.wikipedia.org on Aug. 20, 2013.

"Enterprise JavaBeans" downloaded from http://en.wikipedia.org on Aug. 19, 2013.

"List of tools for static code analysis" downloaded from http://en.wikipedia.org on Aug. 19, 2013.

"Taint checking" downloaded from http://en.wikipedia.org on Aug. 20, 2013.

Evgeny Beskrovny, "Hybrid Program Analysis". U.S. Appl. No. 13/670,270, filed Nov. 6, 2012.

Paolina Centonze, et al. "Role-Based Access Control Consistency Validation". ISSTA'06, Jul. 17-20, 2006, Portland, Maine, USA.

* cited by examiner

AUTOMATIC GENERATION OF ANALYSIS-EQUIVALENT APPLICATION CONSTRUCTS

STATEMENT OF GOVERNMENT RIGHTS

Not Applicable.

CROSS-REFERENCE TO RELATED APPLICATIONS

Not Applicable.

STATEMENT REGARDING PRIOR DISCLOSURES BY THE INVENTOR OR A JOINT INVENTOR

Not Applicable.

FIELD OF THE INVENTION

The present invention relates to the electrical, electronic and computer arts, and, more particularly, to application development and the like.

BACKGROUND OF THE INVENTION

In the field of static analysis of computer programs, execution of the program code is not required. Based on the static analysis of the program code, certain things may be inferred; for example, security properties, security problems, performance problems, and the like. There are a number of known products that handle static analysis; a non-limiting example is the IBM Security AppScan® Source product (registered mark of, and available from, International Business Machines Corporation, Armonk, N.Y., USA).

SUMMARY OF THE INVENTION

Principles of the invention provide techniques for automatic generation of analysis-equivalent application constructs. In one aspect, an exemplary method includes the step of accessing a computer program to be subjected to static analysis. The computer program includes at least one framework. The at least one framework includes high-level code and at least one configuration file. Another step includes creating from the computer program a specification which describes run-time behavior of the program, including run-time behavior of the at least one framework including the high-level code and the at least one configuration file. Further steps include, based on the specification, generating synthetic high-level code which accurately simulates the run-time behavior of the at least one framework including the high-level code and the at least one configuration file, without framework usage; and carrying out the static analysis of the computer program, based on the synthetic high-level code.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Application and framework are rendered into one programming language.

The static analyzer that is capable of analyzing the application is now also capable of analyzing the framework—there is no need to update or augment the original analyzer because the synthetic code produced is completely analyzable by the existing analyzer.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
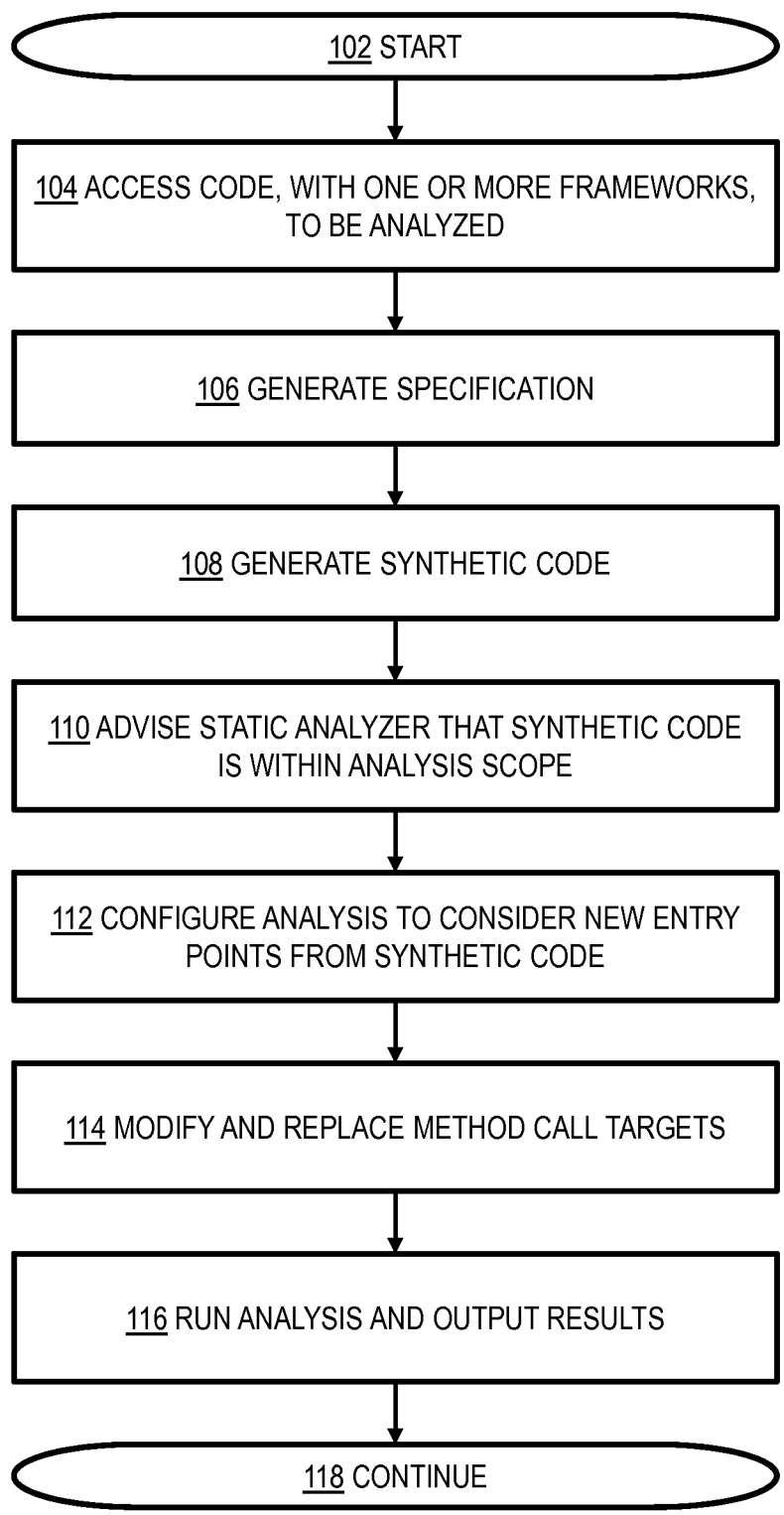
FIG. 1 is a flow chart of an exemplary method, according to an aspect of the invention.

One or more embodiments relate to the field of static analysis of computer programs. As noted, in the field of static analysis, execution of the program code is not required. Based on the static analysis of the program code, one or more things may be inferred; e.g., security properties, security problems, performance problems, and the like. As also noted, there are a number of known products which handle static analysis; a non-limiting example is the IBM RATIONAL SOFTWARE ANALYZER tool available from International Business Machines Corporation, Armonk, N.Y., USA. However, static analysis is becoming more challenging as current programs may be written in multiple languages and may reside on multiple computers. Furthermore, programs have heretofore typically used conventional libraries, wherein program classes are instantiated and become objects, and the objects have methods. When conventional libraries are integrated into programs, the methods of the objects of the library are simply called in a well-known manner. Now, however, the use of frameworks is becoming more prevalent; frameworks are a specialized type of library. In particular, frameworks include not merely code with classes instantiated into objects whose methods can be invoked; frameworks also include configuration files. In a framework, the particular methods that can be invoked in a library at runtime depend on the library and also on the configuration files. It therefore is typically required to analyze the framework as a whole, including the configuration files. If a framework method call is ignored, the static program analysis will be unsound. This is undesirable as it can lead, for example, to a failure of the analysis to identify security or other problems.

One or more embodiments provide the ability to analyze frameworks, wherein the framework, including the classes as well as the configuration files, is represented by generated code which is equivalent to the code plus configuration files of the framework, except that it does not necessarily actually run. Rather, it is equivalent in the sense that when a static analysis is performed, the static analysis works as if it were analyzing a conventional program instead of a framework—the static analysis of the equivalent code will track all the data flows inside the program, all the method invocations, and so on. In essence, the original code of the framework has been integrated with the configuration files of the framework to produce the equivalent code which does not necessarily execute but which can be accurately analyzed by the static analysis tool.

As noted, advantages of one or more embodiments include:
1. Application and framework are rendered into one programming language.
2. The static analyzer that is capable of analyzing the application is now also capable of analyzing the framework—there is no need to update or augment the original analyzer because the synthetic code produced is completely analyzable by the existing analyzer. For example, suppose the original static analyzer is configured to analyze JAVA code. In one or more embodiments, the frameworks are translated into equivalent JAVA code and so can also be analyzed.

By way of review and provision of additional detail, most modern Web applications utilize one or more code libraries, which provide useful abstractions for common Web-application functionality. A framework, discussed briefly above, is a special library that makes extensive use of hard-to-analyze reflective language constructs and configuration files. Existing static-analysis engines are often ineffective when applied to framework-based applications because the semantics of a framework cannot be completely inferred from the source or binary code of the framework itself. To provide a sound static-analysis representation of the run-time behavior of a framework, it is typically necessary to analyze not only the source or binary code of the framework, but also all the supporting configuration files of the framework, and to model all the reflective calls that the framework makes based on the information encoded into its supporting configuration files. Adding support for a large number of frameworks in an ad hoc manner typically does not scale from an engineering standpoint. An alternative approach includes performing a separate framework analysis phase, in which both application code and configuration files are analyzed to generate a specification of framework-related behaviors. One issue with this approach, however, is that once a specification for a framework has been generated (for example, in the form of an XML file), it becomes necessary to integrate that specification into the analysis of the framework itself and the application that uses it.

One or more embodiments advantageously provide a technique, based on source-code generation, for adding code-specification support to a static-analysis engine, such as a taint analyzer. In one or more embodiments, the code generated by this technique has the following characteristics: (1) It is legal source code, in the sense that it can be compiled without compilation errors; (2) It may not be executed (or, if executed as part of the framework it was generated from, it may cause the framework itself to behave differently from its usual behavior); (3) From a static-analysis perspective, the framework code, augmented with the automatically generated code, allows any static analyzer to model the behavior of the framework in a sound manner.

One or more embodiments provide:
(1) A novel approach for automatically generating source code from code specifications, and/or
(2) The minor changes that the underlying analysis engine (e.g., static analyzer 214 in FIG. 2, discussed further below) must undergo to account for that source code at analysis time.

This approach is appealing because the changes to the engine 214 are minimal, the generated JAVA or other code can be made understandable for developers, and much of the work can be reused across analysis engines.

There are several techniques that can be used to incorporate code specifications into an existing static analysis engine. One or more embodiments generate synthetic yet legal source code representing the code specification and simply change the existing analysis to also analyze this new source code. An alternative includes deeply modifying the existing analysis to account for the results of the code-specification generator 208, discussed further below. In both techniques, the existing analysis code is modified to make use of the call replacements and new entry points produced by the code-specification generator. The approach based on deeply modifying the existing analysis, however, involves the modification of the intermediate representation (IR) of certain methods in the call graph to account for the new control and data flows reported by the code-specification generator.

The first approach, i.e., to generate synthetic yet legal source code representing the code specification and to simply change the existing analysis to also analyze this new source code, is much more lightweight as compared to the alternative, since direct IR generation is not needed; the new code can be compiled into binary code and added to the analysis scope. In this aspect, modifying the existing analysis to include new entry points is a trivial task, and making the analysis perform call replacements is a very isolated change. Furthermore, the synthetic code produced in one or more embodiments can be read and interpreted by a developer more easily than a synthetic IR would be in case there are questions about the code transformations. Another advantage of one or more embodiments is its portability, since the synthetic code generated from the code specifications can be easily plugged into any existing analysis engine.

Figure 2:
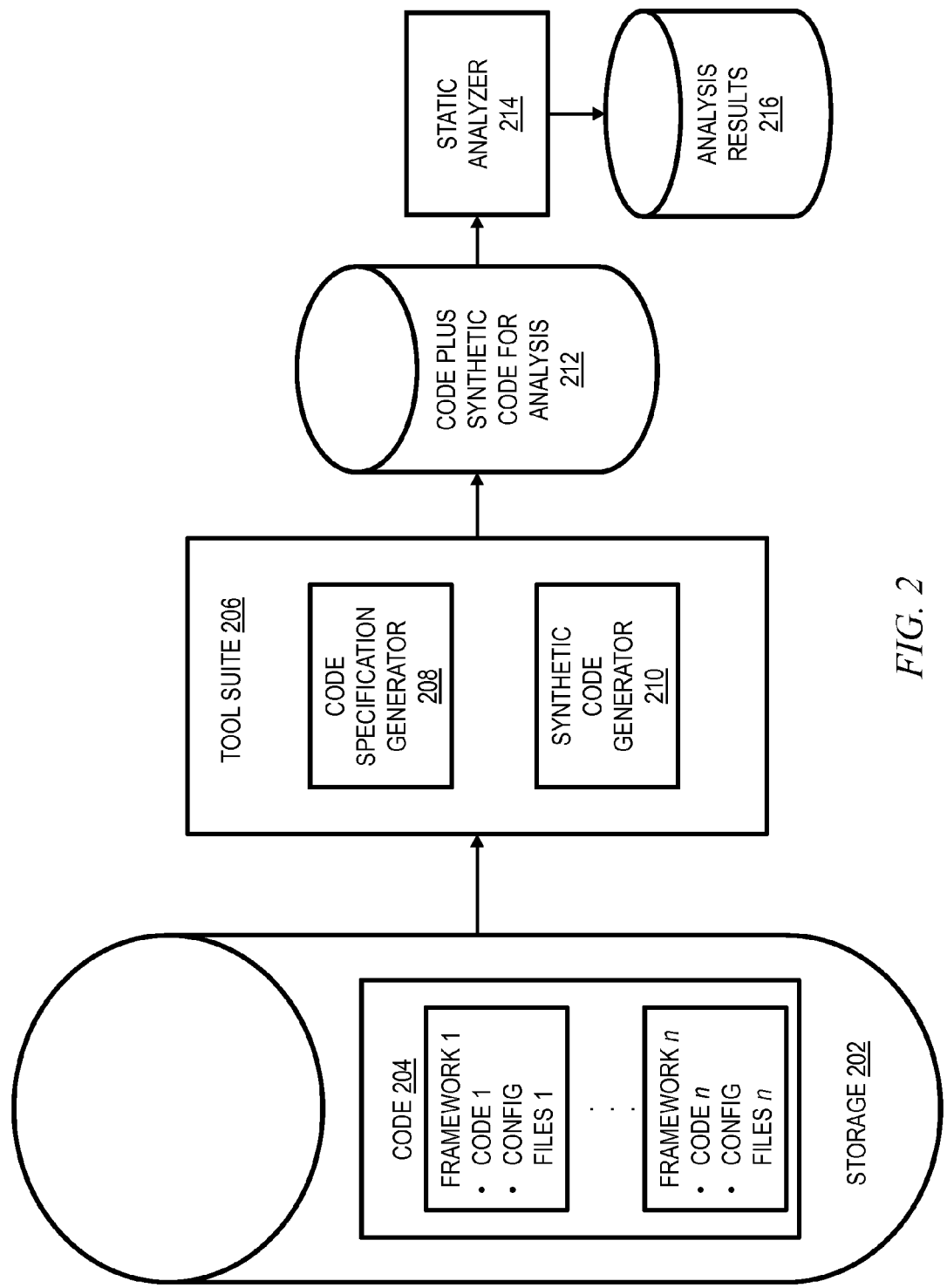
FIG. 2 is a block diagram of an exemplary system, according to an aspect of the invention.

Reference should now be had to the flow chart of FIG. 1, which begins at 102, and to the block diagram of FIG. 2. In step 104, access is obtained to the code 204 to be analyzed, which includes one or more frameworks 1 . . . n. Such code is located in storage 202. Each framework includes code and one or more configuration files. In step 106, generate a specification of code 204, using code specification generator 208 of tool suite 206. In step 108, automatically produce synthetic code representing the output of the code-specification generator 208, using synthetic code generator 210 of tool suite 206. In step 110, communicate to the existing static analysis engine 214 that this new code is also part of the analysis scope. This is depicted at 212 in FIG. 2, which shows that the analysis is carried out on the "pure" code portion of code 204 with the frameworks replaced by the synthetic code generated by generator 210.

In step 112, configure the analysis 214 to also consider the new entry points established by the code-specification generator 208. In step 214, modify the targets of certain method calls in the application under analysis and replace them according to the output of the code-specification generator 208. In step 116, run the analysis on the code plus synthetic code 212 using engine 214 to obtain the results 216. Processing continues at 118.

In one or more embodiments, this method provides a very attractive solution because the changes to the existing analysis are minimal, and integrating code specifications into other analyses that also need to be made framework-aware becomes a relatively easy task.

One or more embodiments provide a system, method and apparatus employing a Synthetic Code Generator (SCG) 210 that generates source code from code specifications for use with static analysis. For each synthetic method in the input code specification, SCG generates a corresponding method in a synthetic class whose statements correspond to the expressions in the synthetic method. One pertinent case in this translation is handling method call expressions. One issue with calls is that a code specification may not specify values for some actual parameters if they are not directly relevant to potential control and data flows. These invocations would turn out to be on uninitialized variables, and would be rejected by the compiler. One "easy" solution to this problem is to set a temporary variable to null and invoke a method on that temporary variable. However, in many analyses that perform intra-procedural type inference, this code will not be analyzed correctly because it is an obvious invocation on null, which the analysis refuses to account for. Ideally, SCG calls the correct constructor for the type of the temporary variable, but since the temporary variable can be of any type, it is not clear which constructor to call. In particular, the declared type of the temporary variable could be abstract (and so, no constructor exists), or a default constructor (the one with no parameters) may not exist. In the first case, it may become necessary to look for implementations of that abstract class, and in the second case, it may become necessary to look for another constructor, with the additional problems that the parameters to that constructor may also have to be initialized. In one or more embodiments, SCG 210 gets around this problem by adding a level of indirection via a method call that returns null. Since the assignment to null is performed in another procedure, this confuses the intra-procedural type inference that the analysis performs, and the result is sufficient to model taint propagation faithfully.

Another tricky situation arises when SCG must generate the invocation of a default- or protected-scope method m, which by default cannot be invoked except from the same package p. SCG handles this restriction by generating a fresh public class p.C in the desired package that contains a public method C.m' that simply invokes m and returns its value. Since, in one or more embodiments, the generated code is not being executed, there is no need to worry about sealed packages preventing the generation of C. Being public, the synthetic method can be invoked without restrictions, and being in the same package as the restricted method, it is not affected by the package-boundary restrictions.

The rest of the translation is straightforward to the skilled artisan, given the teachings herein. For example, if the underlying static analysis is a taint analysis for Java code, taint expressions are translated to an invocation of HttpServletRequest.getParameter( ) (one or more embodiments use the same technique used for method calls if a request pointer is not in scope). One or more embodiments translate nondet expressions by essentially generating a switch on the value of a public static integer, which the JAVA compiler will be unable to simplify. Globals are translated to static fields, with an appropriate fresh class generated for the global if it has properties. In one or more embodiments, SCG 210 handles call replacements by generating a fresh method for each call replacement. The fresh method is given the same signature (argument and return types) as the method being invoked at the call site to be replaced, with the idea that the analysis engine 214 will treat the original call as if it were invoking the fresh method.

Assuming that the output of code-specification generator 208 includes a set of synthetic methods, a set of call replacements, and a set of entry points, SCG 210 takes such output and transforms it to work with the analysis engine 214. Each call replacement has a synthetic method associated with it. This is the method that the analysis should consider in place of the one specified in the application source code. Since call replacements are done on a specific call site, SCG gives these synthetic methods unique names, and saves the mapping from generated method name to call replacement in a file (e.g., at 212) that the analysis 214 reads at startup. Each entry in the call-replacement file contains the fully qualified signatures of the calling, originally called, and synthetic methods, along with the line number and the program counter of the call. The originally called and synthetic methods share the same number and types of parameters so the actual parameters with which the originally called method was called become the actual parameters of the call to the synthetic method.

Call replacements can affect the underlying static-analysis engine 214 at multiple levels. A taint analysis typically includes an analysis-scope and class-hierarchy creation, a pointer-analysis and call-graph construction, and a taint-propagation analysis. Modifying the analysis scope is straightforward, given the teachings herein, since it is sufficient to add the new classes to the set of classes under analysis. This automatically updates the class hierarchy as well. The pointer-analysis and call-graph constructions are modified in a simple manner: every time a call to a method that needs to be replaced is encountered, the analysis replaces the target method with the synthetic method specified in the call-replacement file. Finally, taint propagation is affected only when taint enters a method call. In this case, the taint-propagation algorithm simply has to propagate taint inside the synthetic method instead of the method that was originally called.

By way of an illustrative example (and not limitation), consider a program written in JAVA and with some framework(s) in a language other than JAVA. One or more embodiments translate the framework(s) into equivalent JAVA code which does not necessarily need to execute but which, when analyzed by the static analyzer 214, will yield accurate results that simulate how the actual JAVA program plus non-JAVA framework would behave at runtime. Note, the framework might also be in JAVA in other situations; however, in addition to the JAVA code of the framework, there would also be configuration files which are pertinent in establishing the behavior of the framework. One or more embodiments create a new equivalent JAVA code for the framework(s) which has encoded therein JAVA instructions which cause the equivalent JAVA code to behave in the same way as the framework in accordance with the configuration files.

In one or more embodiments, the equivalent code is referred to as synthetic code; this code is tool-created and compilable but not necessarily executable. Furthermore, this code is legal code in the sense that it does not include syntax errors or the like, and will be accepted by a compiler.

Note that in at least some instances, the code plus synthetic code 212 is compiled before running analyzer 214. This is possible because the code that the tool produces is completely legal from a compilation point of view, in the sense that any compiler will accept it. This allows analyzers that only analyze compiled code to analyze the synthetic code 212 without any problems. Nevertheless, this step is not mandatory; if an analyzer accepts source code, the source code of the synthetic code could be analyzed without having to compile it first.

In one or more embodiments, the following process is used to generate the analysis-equivalent synthetic code. In step 106, a specification is generated from the framework and its associated configuration files. Consider ENTERPRISE JAVABEANS, which is a well-known JAVA framework. It includes new types of classes called beans. Each bean includes an Enterprise JavaBeans class and four different Enterprise JavaBeans interfaces; namely, EJB Remote interface, EJB RemoteHome interface, EJB Local interface, and EJB LocalHome interface. The interfaces have no implementation code; they just list names and signatures of methods. The code is all in the EJB class. When a program wants to use an Enterprise JAVABEAN, it does not call the EJB class; rather, it uses one of the interfaces. Then, the runtime environment looks at the interface and determines where the relevant code is located by looking at a configuration file referred to as a deployment descriptor. The runtime code understands that it needs to look into the EJB class. Thus, at runtime, the mapping is resolved and the code is replaced accordingly. However, during static analysis, the process just described is not carried out. Thus, one or more embodiments create the aforementioned specification. In the specification, every time a call to the remote interface is noted, a look is taken into the EJB class for a method with the same signature, and so on.

In step 108, generate the synthetic code—in the framework, any call to an interface is replaced with the actual code of the method that will be used at runtime. This results in the aforementioned synthetic code.

One or more embodiments employ a tool suite 206 which accepts as an input a combination of source code and configuration files; in essence, a framework. The tool reads into the code of the framework and the configuration files and creates mapping(s) that can be used to resolve method calls at runtime. The mappings are the same mappings that the runtime would implement; however, the mappings are created statically as opposed to dynamically.

In one or more embodiments, the tool 210 changes the code of the framework and replaces it with new code in which all the mappings are put in place. For example, suppose there is a call to an interface method M1. This call is replaced at runtime by a call to a method in an actual class called M2. In one or more embodiments, replace M1 with M2 physically, based on the mappings. Whenever a call to M1 is seen, that call is immediately routed to M2. Now, the entire program flow can be routed based on these replacements. It is worth noting that the process described in this paragraph is typically not carried out at an ordinary runtime.

Suppose, for illustrative purposes, that a method has two parameters, P1 and P2. Suppose as soon as the method with parameters P1 and P2 is called, the method immediately calls another method on the parameter P2; say, P2.$f$, where $f$ is a method (a function). Suppose P2 was not instantiated. Then, the mapping will be assigned the value null. This will result in a run point exception. To address this problem, create an object and assign it to the variable P2. So, even when a method is replaced with another method, all the parameters of the new method should be instantiated to avoid a run point exception.

Suppose in the example above, M2 cannot really be invoked; for example, suppose it is a private or protected method. This would result in a problem when compilation was requested, since a private method cannot be invoked from outside of its class. Some embodiments provide helper methods to bypass package restrictions, to address these kinds of issues.

One or more embodiments implement the following steps, without decompiling: generating analyzable source code specifying dependencies for static analysis; statically modeling code behavior; generating a source code equivalent of a container; and automatically generating source code that models interactions between a framework and a container.

In one aspect, an exemplary method for generating source code modeling interaction between framework and container includes the steps of receiving input of code with frameworks, and, for each synthetic method in the input code specification, generating a corresponding method in a synthetic class whose statements correspond to the expressions in the synthetic method.

In another aspect, an exemplary method for static analysis of code includes the steps of receiving input of code, wherein the code includes frameworks having configuration files that are not accessible for analysis; automatically generating analyzable source code representing the framework's configuration files; and providing the analyzable code for static analysis.

In still another aspect, an exemplary method for generating source code that soundly models the run-time interaction between framework and container includes the steps of receiving input of (1) application code and (2) either (i) framework code with container code or (ii) just framework specification code; and, for each method in the framework code or synthetic method in the input code specification, generating a corresponding method in a synthetic class whose statements correspond to the expressions in the synthetic method.

Figure 4:
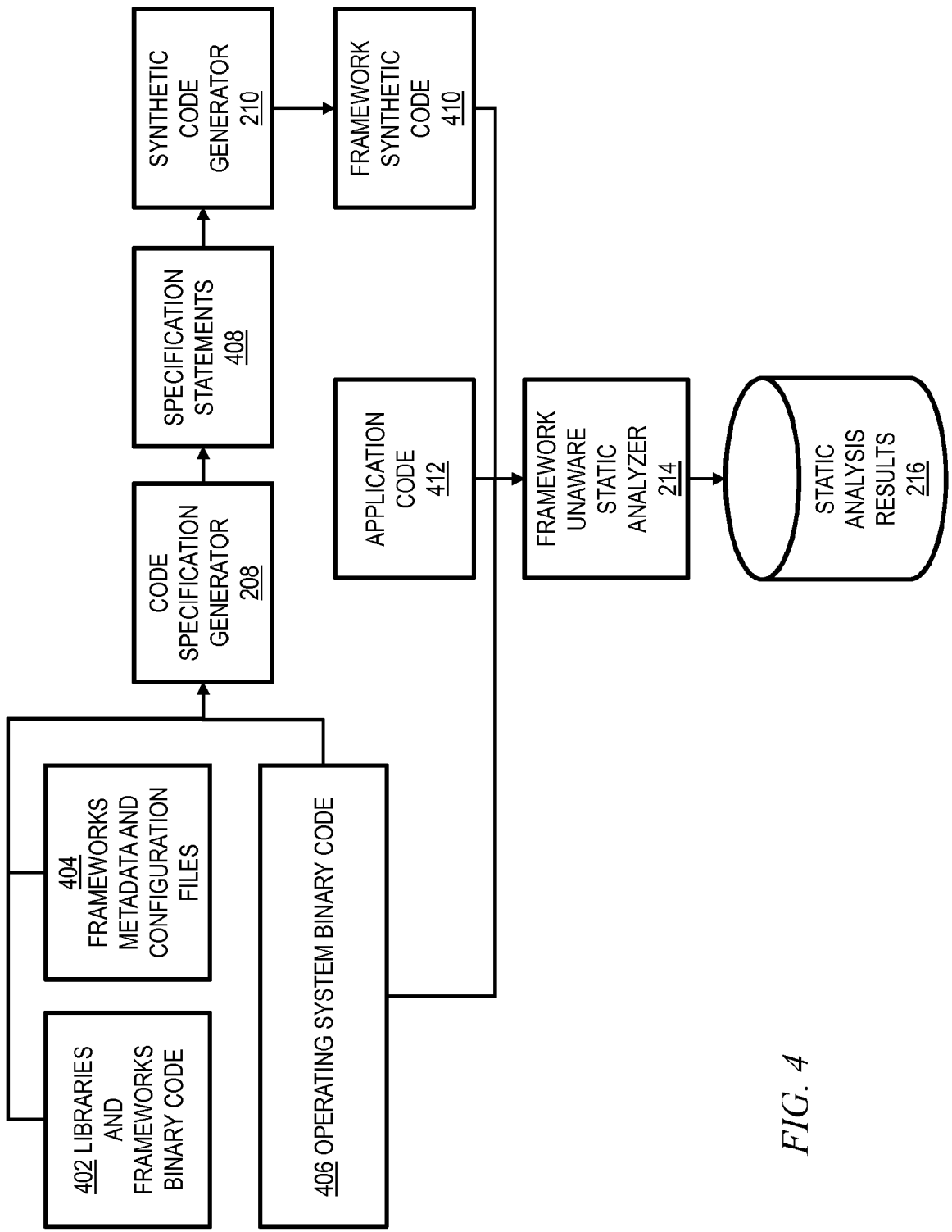
FIG. 4 is an exemplary flow diagram, according to an aspect of the invention.

By way of review and provision of additional non-limiting exemplary details, refer to the exemplary flow diagram of FIG. 4, wherein elements similar to those in the earlier figures have received the same reference character. Refer also back to FIG. 2. As seen in FIGS. 2 and 4, the code 204 on which code specification generator 208 operates in some cases includes libraries and frameworks binary code 402, frameworks metadata and configuration files 404, and operating system binary code 406. The result is a set of specification statements 408, discussed further below. These are used by synthetic code generator 210 to produce framework synthetic code 410; code 410, together with application code 412, forms the code 212 analyzed by the framework unaware static analyzer 214. The results are output at 216.

Figure 5:
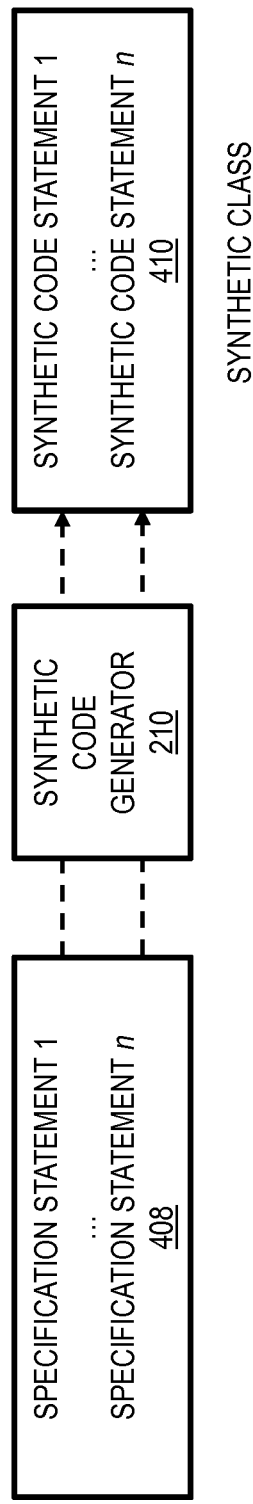
FIG. 5 shows correspondence of specification statements to synthetic code statements, according to an aspect of the invention.

FIG. 5 shows correspondence of specification statements to synthetic code statements; again, elements similar to those in the earlier figures have received the same reference character. The specification includes a series of statements 1 . . . n, at 408, which, in this example, are input to the synthetic code generator 210, resulting in the generation of a synthetic class including a series of synthetic code statements 1 . . . n, at 410.

Figure 6:
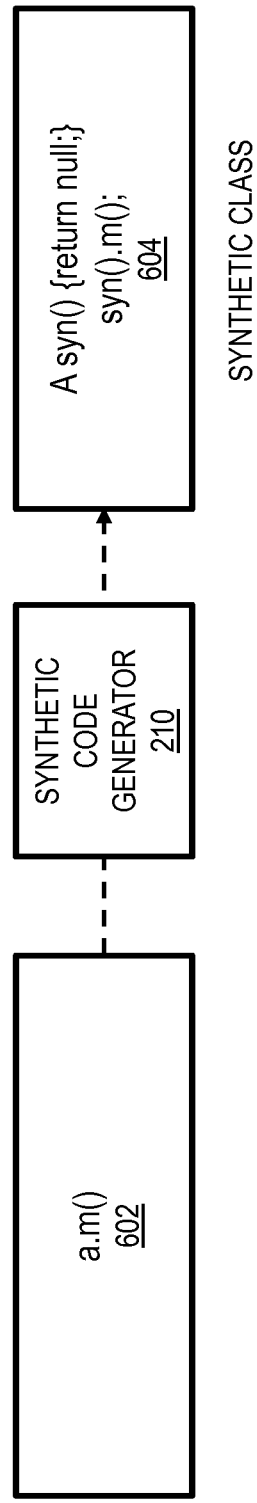
FIG. 6 shows specification statement a.m( ) where a is an object of type A:, according to an aspect of the invention.

FIG. 6 shows specification statement a.m( ) where a is an object of type A:. The statement 602 results in the synthetic class 604.

Figure 7:
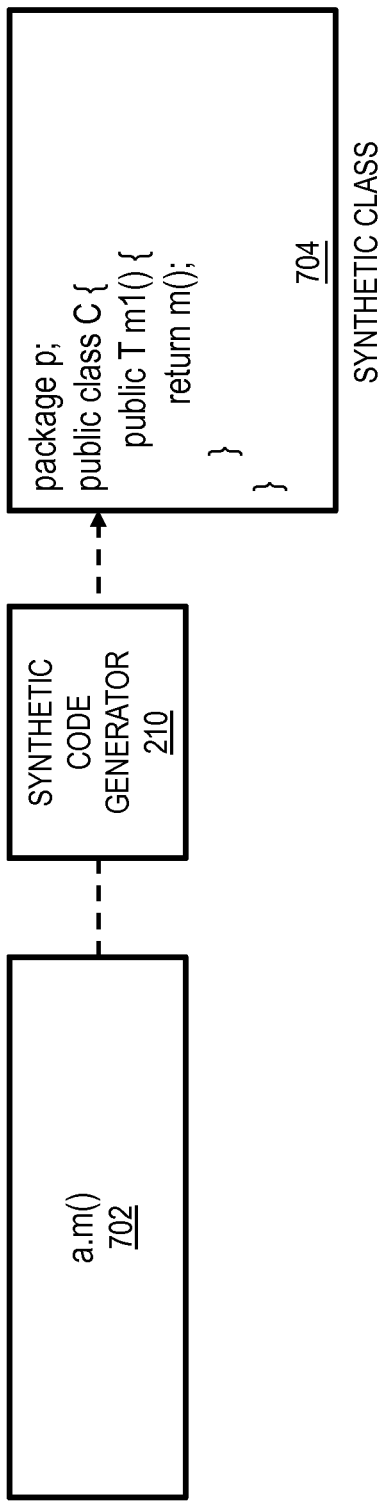
FIG. 7 shows specification statement a.m( ) where m in package p is package-restricted, according to an aspect of the invention.

FIG. 7 shows specification statement a.m( ) where m in package p is package-restricted. The statement 602 results in the synthetic class 604. If m returns an object of type T, create a synthetic class C in the same package p as the package restricted method. Class C has a public method m1 that simply invokes m and returns m's return value.

Given the discussion thus far, it will be appreciated that, in general terms, an exemplary method, according to an aspect of the invention, includes the step 104 of accessing a computer program 204 to be subjected to static analysis. The computer program includes at least one framework (e.g., Framework 1 . . . Framework n). The at least one framework includes high-level code and at least one configuration file. This step can be carried out, for example, by code specification generator 208. A further step 106 includes creating, from the computer program, a specification which describes run-time behavior of the program, including run-time behavior of the at least one framework including the high-level code and the at least one configuration file. This step can also be carried out, for example, by code specification generator 208. A further step 108 includes, based on the specification, generating synthetic high-level code which accurately simulates the run-time behavior of the at least one framework including the high-level code and the at least one configuration file, without framework usage. This step can be carried out, for example, by synthetic code generator 210. A still further step 116 includes carrying out the static analysis of the computer program, based on the synthetic high-level code. This step can be carried out, for example, by static analyzer 214.

In some cases, the step 106 of creating the specification further includes establishing new entry points, and the method further includes considering the new entry points when carrying out the static analysis, as at 112.

In some such cases, the step 106 of creating the specification further includes creating a set of synthetic methods and a set of call replacements. Each of the call replacements has a corresponding one of the synthetic methods associated therewith, and the generating step 108 includes replacing actual method call targets in the computer program with calls to the synthetic methods, as at 114.

Some embodiments further include compiling the synthetic high-level code prior to carrying out the static analysis with analyzer 214, such that the static analysis is carried out on the compiled synthetic high-level code.

In some cases, the high-level code includes JAVA code and the carrying out of the static analysis 116 includes carrying out taint analysis.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
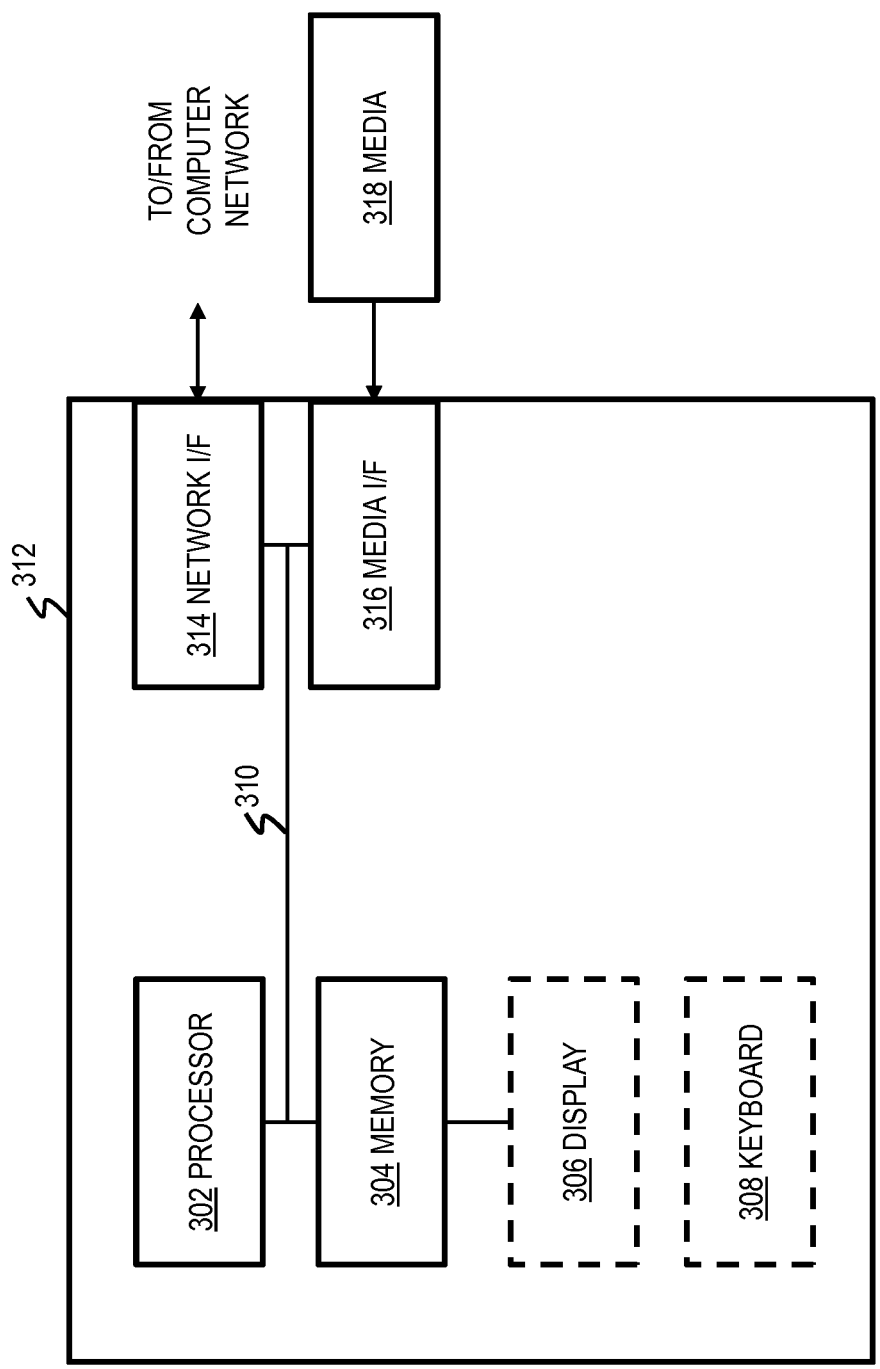
FIG. 3 depicts a computer system that may be useful in implementing one or more aspects and/or elements of the invention.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a code specification generator module, a synthetic code generator module, and optionally a static analysis module. The method steps can then be carried out using the distinct software modules and/or sub-modules of the system, as described above, executing on one or more hardware processors 302. For example, the code specification generator module executing on at least one hardware processor implements the code specification generator 208; the synthetic code generator module executing on the at least one hardware processor implements the synthetic code generator 210; and the static analysis module executing on the at least one hardware processor implements the static analyzer 214. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   accessing a computer program comprising application code and at least one framework, said at least one framework comprising high-level code and at least one configuration file;
   creating a specification which describes run-time behavior of said computer program, including run-time behavior of said at least one framework comprising said high-level code and said at least one configuration file;
   generating, using said specification, synthetic high-level code which simulates said run-time behavior of said at least one framework comprising said high-level code and said at least one configuration file, wherein said synthetic high-level code integrates said at least one configuration file into said at least one framework by replacing a plurality of method call targets in said framework with respective calls to a plurality of synthetic methods;
   compiling said synthetic high-level code into compiled synthetic high-level code;
   carrying out a static analysis of said computer programing using said application code and said compiled synthetic high-level code; and
   providing a system, wherein the system comprises distinct software modules, each of the distinct software modules being embodied on a computer-readable storage medium, and wherein the distinct software modules comprise a code specification generator module and a synthetic code generator module;
   wherein:
      said accessing and said creating are carried out by said code specification generator module executing on at least one hardware processor; and
      said generating is carried out by said synthetic code generator module executing on said at least one hardware processor.

2. The method of claim 1, wherein said step of creating said specification further comprises establishing new entry points, further comprising considering said new entry points when carrying out said static analysis.

3. The method of claim 2, wherein said step of creating said specification further comprises creating said plurality of synthetic methods and a set of call replacements, each of said call replacements having a corresponding one of said synthetic methods associated therewith.

4. The method of claim 1, wherein said high-level code comprises JAVA code and wherein said carrying out of said static analysis comprises carrying out taint analysis.

5. The method of claim 1, wherein, in said providing step, said distinct software modules further comprise a static analysis module, and wherein said static analysis of said computer program is carried out by said static analysis module executing on said at least one hardware processor.

6. A computer program product comprising a non-transitory computer readable storage medium having computer readable program code embodied therewith, said computer readable program code comprising:
   computer readable program code configured to access a computer program comprising application code and at least one framework, said at least one framework comprising high-level code and at least one configuration file;
   computer readable program code configured to create a specification which describes run-time behavior of said program, including run-time behavior of said at least one framework comprising said high-level code and said at least one configuration file;
   computer readable program code configured to generate, using said specification, synthetic high-level code which simulates said run-time behavior of said at least one framework comprising said high-level code and said at least one configuration file, wherein said synthetic high-level code integrates said at least one configuration file into said at least one framework by replacing a plurality of method call targets in said framework with respective calls to a plurality of synthetic methods;

computer readable program code configured to facilitate compilation of said synthetic high-level code into compiled synthetic high-level code;

computer readable program code configured to carry out a static analysis of said computer programing using said application code and said compiled synthetic high-level code; and providing a system, wherein the system comprises distinct software modules, each of the distinct software modules being embodied on said computer-readable storage medium, and wherein the distinct software modules comprise a code specification generator module and a synthetic code generator module;

wherein:
said accessing and said creating are carried out by said code specification generator module executing on at least one hardware processor; and said generating is carried out by said synthetic code generator module executing on said at least one hardware processor.

7. The computer program product of claim 6, wherein said computer readable program code configured to create said specification further comprises computer readable program code configured to create establish new entry points, further comprising computer readable program code configured to consider said new entry points when carrying out said static analysis.

8. The computer program product of claim 7, wherein said computer readable program code configured to create said specification further comprises computer readable program code configured to create said plurality of synthetic methods and a set of call replacements, each of said call replacements having a corresponding one of said synthetic methods associated therewith.

9. The computer program product of claim 6, wherein said high-level code comprises JAVA code and wherein said carrying out of said static analysis comprises carrying out taint analysis.

10. An apparatus comprising:
a memory;
at least one processor, coupled to said memory, and operative to:
access a computer program comprising application code and at least one framework, said at least one framework comprising high-level code and at least one configuration file;

create a specification which describes run-time behavior of said computer program, including run-time behavior of said at least one framework comprising said high-level code and said at least one configuration file;

generate, using said specification, synthetic high-level code which simulates said run-time behavior of said at least one framework comprising said high-level code and said at least one configuration file, wherein said synthetic high-level code integrates said at least one configuration file into said at least one framework by replacing a plurality of method call targets in said framework with respective calls to a plurality of synthetic methods;

compile said synthetic high-level code into compiled synthetic high-level code; and carry out a static analysis of said computer programing using said application code and said compiled synthetic high-level code; and a plurality of distinct software modules, each of the distinct software modules being embodied on a computer-readable storage medium, and wherein said distinct software modules comprise a code specification generator module and a synthetic code generator module;

wherein:
said at least one processor is operative to access said computer program and create said specification by executing said code specification generator module; and said at least one processor is operative to generate said synthetic high-level code by executing said synthetic code generator module.

11. The apparatus of claim 10, wherein said at least one processor is further operative to create said specification by establishing new entry points, and to consider said new entry points when carrying out said static analysis.

12. The apparatus of claim 11, wherein said at least one processor is further operative to create said specification by creating said plurality of synthetic methods and a set of call replacements, each of said call replacements having a corresponding one of said synthetic methods associated therewith.

13. The apparatus of claim 10, wherein said high-level code comprises JAVA code and wherein said carrying out of said static analysis comprises carrying out taint analysis.

14. The apparatus of claim 10, wherein the distinct software modules further comprise a static analysis module, and wherein said at least one processor is operative to carry out said static analysis by executing said static analysis module.

* * * * *